US012645784B2

(12) United States Patent   (10) Patent No.:   US 12,645,784 B2
Romansky et al.   (45) Date of Patent:        Jun. 2, 2026

(54) OFFLINE DIGITAL ASSET GENERATION AND PROVISIONING

(71) Applicant: INTEGRITY Security Services LLC, Ashburn, VA (US)

(72) Inventors: Brian Romansky, Monroe, CT (US); Alan T. Meyer, Anaheim, CA (US)

(73) Assignee: INTEGRITY SECURITY SERVICES LLC, Ashburn, VA (US)

( * ) Notice: Subject to any disclaimer, the term of this patent is extended or adjusted under 35 U.S.C. 154(b) by 0 days.

(21) Appl. No.: 19/259,531

(22) Filed: Jul. 3, 2025

(65) Prior Publication Data

US 2026/0010614 A1      Jan. 8, 2026

Related U.S. Application Data

(60) Provisional application No. 63/668,045, filed on Jul. 5, 2024.

(51) Int. Cl.
      *G06F 21/45*          (2013.01)
      *G06F 21/57*          (2013.01)
(52) U.S. Cl.
      CPC .............. *G06F 21/45* (2013.01); *G06F 21/57* (2013.01)
(58) Field of Classification Search
      CPC ................................. G06F 21/45; G06F 21/57
      See application file for complete search history.

(56) References Cited

U.S. PATENT DOCUMENTS 10,599,819 B2 *   3/2020   Lattin ................... H04W 12/06
11,695,574 B2     7/2023   Barrett et al.

2002/0065780 A1 *   5/2002   Barritz .................... G06F 21/10
                                                               705/59
2004/0185842 A1 *   9/2004   Spaur ..................... B60R 25/33
                                                               455/410
2012/0143766 A1 *   6/2012   Zheng .................. G06F 21/105
                                                               705/59

(Continued)

FOREIGN PATENT DOCUMENTS

WO          2020014024  A1       1/2020

OTHER PUBLICATIONS

International Search Report and Written Opinion dated Sep. 10, 2025, PCT Application No. PCT/US2025/036439, 9 pages.

*Primary Examiner* — David J Pearson

(74) *Attorney, Agent, or Firm* — MH2 Technology Law Group, LLP

(57)                    ABSTRACT

A system for offline generation of digital assets includes: a security credential management system (SCMS) that is operable to generate and conditionally transmit digital assets; and a certificate authority communicatively connected to the SCMS by a communication network, the certificate authority being operable to receive the digital assets from the SCMS. The certificate authority is operable to securely provision a plurality of computerized devices based on the received digital assets, the certificate authority intermittently connects to the SCMS to receive the digital assets, the certificate authority is operable to securely provision the plurality of computerized devices while disconnected from the SCMS, and the provisioning by the certificate authority while disconnected from the SCMS is limited by a policy associated with the certificate authority.

22 Claims, 4 Drawing Sheets

(56) References Cited

U.S. PATENT DOCUMENTS

| | | | |
|---|---|---|---|
| 2014/0380499 A1* | 12/2014 | Pruss | G06F 21/62 |
| | | | 726/27 |
| 2016/0173286 A1* | 6/2016 | Gallagher | H04L 9/321 |
| | | | 713/156 |
| 2021/0288821 A1* | 9/2021 | Young | H04L 9/3265 |
| 2021/0306161 A1* | 9/2021 | Medvinsky | E02B 3/122 |
| 2022/0158854 A1 | 5/2022 | Simplicio et al. | |
| 2024/0214807 A1* | 6/2024 | Rivera | H04L 9/3268 |

* cited by examiner

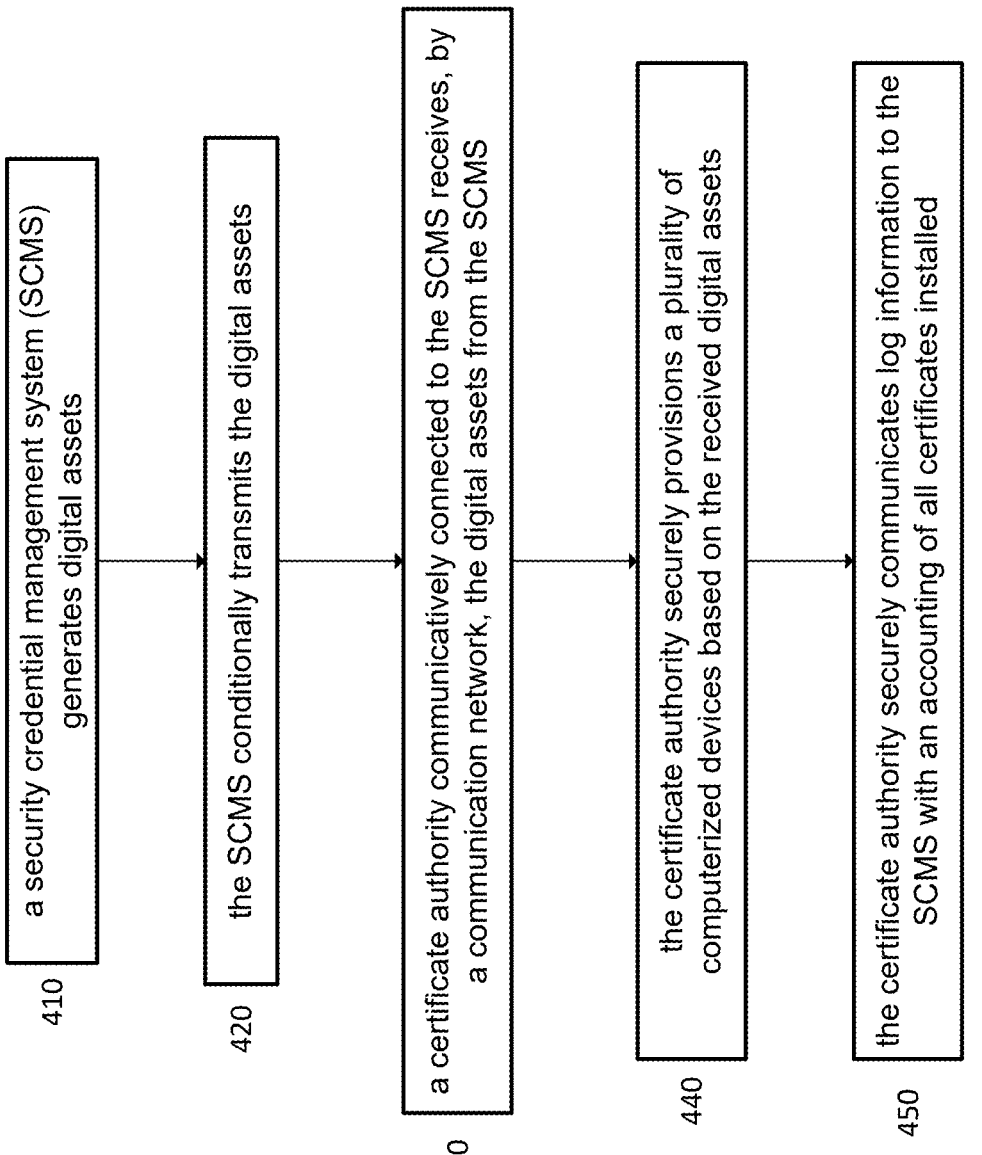

410  a security credential management system (SCMS) generates digital assets 420  the SCMS conditionally transmits the digital assets 430  a certificate authority communicatively connected to the SCMS receives, by a communication network, the digital assets from the SCMS 440  the certificate authority securely provisions a plurality of computerized devices based on the received digital assets 450  the certificate authority securely communicates log information to the SCMS with an accounting of all certificates installed

FIG. 4

OFFLINE DIGITAL ASSET GENERATION AND PROVISIONING

CROSS-REFERENCE TO RELATED APPLICATIONS

This application claims the benefit of U.S. Provisional Application No. 63/668,045 filed on 5 Jul. 2024, which is hereby incorporated by reference in its entirety. This application is related to U.S. patent application Ser. No. 18/673, 968 filed on 24 May 2024, which is hereby incorporated by reference in its entirety.

FIELD OF THE INVENTION

This invention relates to the systems, devices, computer applications, and methods for offline digital asset (e.g., digital certificate), generation and provisioning, for example, for vehicles.

BACKGROUND

As computers have become ever more miniaturized and commoditized, manufacturers are producing more and more varied devices that include one or more embedded computer or processor. The computer in a computerized device can control the device's operation; collect, store, and share data; communicate with other computers and other computerized devices; and update its own software, among other things.

The Internet of things (IoT) is the network of computerized physical devices that have embedded processor(s), electronics, software, data, sensors, actuators, and/or network connectivity, which enable these devices to connect and exchange data via digital networks, including the Internet, cellular networks, and other wireless networks. Typically, each "thing" is uniquely identifiable through its embedded computing system, and is able to inter-operate within the existing Internet infrastructure.

"Things", in the IoT sense, can refer to a wide variety of computerized devices, such as consumer appliances, enterprise devices used in business and corporate settings, manufacturing machines, farming equipment, energy-consuming devices in homes and buildings (switches, power outlets, appliances, lighting systems, bulbs, televisions, garage door openers, sprinkler systems, security systems, etc.), medical and healthcare devices, infrastructure management devices, robots, drones, and transportation devices and vehicles, among many others.

For example, most, if not all, modern vehicles and transportation machinery (e.g., automobiles, trucks, aircraft, trains, watercraft, motorcycles, scooters, and the like) contain several embedded processors or embedded computers in their subsystems, and are computer-controlled in at least some aspects. Similarly, a growing number of modern transportation infrastructure devices (e.g., traffic lights, traffic cameras, traffic sensors, bridge monitors, bridge control systems, and the like) contain at least one, and often many, embedded processors or embedded computer systems, and are computer-controlled in at least some aspects. These computer-controlled elements of the transportation network typically communicate with each other, passing various types of information back and forth, and they may react, respond, change their operation, or otherwise depend upon the information received/sent from/to other vehicles in Vehicle-to-Vehicle (V2V; also known as C2C, Car-to-Car) communications and/or from/to infrastructure elements in Vehicle-to-Infrastructure (V2I, also known as C2I, Car-to-Infrastructure) communications for safe, correct, efficient, and reliable operation.

The computers in computerized devices operate according to their software and/or firmware and data. In order to ensure safe and proper operation, the computerized devices must be properly initialized and updated with the proper software, firmware, executable instructions, digital certificates (e.g., public key certificates), cryptographic keys and the like (hereinafter collectively referred to as "digital assets" or "software") as intended by the manufacturer, so that the IoT consists only of devices that are executing authorized, known-to-be-good software and data. Problems arise, however, when unauthorized persons or organizations (e.g., hackers) replace or change the software in computerized devices. Problems also arise when older software, untested software, unapproved software, and/or software with known bugs is installed in computerized devices. In addition, some devices need to be provided with credentials so that they can send messages that will be trusted by external systems.

Accordingly, it is desirable to provide improved systems, methods and techniques for securely provisioning the digital assets in computerized devices, so as to prevent the computerized devices from operating using error-ridden, incorrectly functioning, untested, maliciously altered, or otherwise undesirable software and data, and to enable remote systems to authenticate messages originating from the devices.

Production or manufacturing of computerized devices and systems, such as OEM vehicle production, requires high-availability services. A Security Credential Management System (SCMS) (e.g., 110) is typically operated as a centralized service which requires access via a communications network to support enrollment of new devices, and the manufacturer typically needs a working communications/network connection between the manufacturer's equipment and the SCMS in order to get the digital assets (e.g., digital certificates such as enrollment certificates (and/or other types of certificates, such as pseudonym certificates, application certificates, etc.)) needed for production. In practice, however, the communications/network connection occasionally fails or otherwise disconnects, which causes production to halt, at least temporarily, until the connection is restored.

Accordingly, it is desirable to provide improved systems, methods, products, and techniques for on-demand enrollment of newly manufactured computerized devices, (e.g., new vehicle equipment/devices, such as On-Board Units or OBUs) without the need for an external network connection, e.g., to a central SCMS service. Various embodiments described herein address the above-noted and other drawbacks associated with conventional systems and techniques for digital asset generation and provisioning.

SUMMARY

Disclosed herein are systems, methods and devices for securely generating and providing certain types of digital assets such as security credentials and digital certificates. In various implementations, the systems, methods, and devices use a security credential management system (SCMS) to create and provide certain types of digital assets such as security credentials and public key certificates. In some implementations, the SCMS provides certificates such as enrollment certificates (and/or other types of certificates, such as pseudonym certificates, application certificates, etc.) in response to requests for such certificates.

In various implementations, a system for offline generation of digital assets includes: a security credential management system (SCMS) that is operable to generate and conditionally transmit digital assets; and a certificate authority communicatively connected to the SCMS by a communication network, the certificate authority being operable to receive the digital assets from the SCMS. The certificate authority is operable to securely provision a plurality of computerized devices based on the received digital assets, the certificate authority intermittently connects to the SCMS to receive the digital assets, the certificate authority is operable to securely provision the plurality of computerized devices while disconnected from the SCMS, and the provisioning by the certificate authority while disconnected from the SCMS is limited by a policy associated with the certificate authority.

In some implementations, the certificate authority is a distribution appliance located remotely from the SCMS.

In some implementations, the SCMS comprises a digital asset management system (DAMS).

In some implementations, the certificate authority is located at the site of a device manufacturer, and the SCMS is remote from the device manufacturer.

In some implementations, the policy limits the provisioning by the certificate authority while disconnected from the SCMS according to a time of disconnection from the SCMS.

In some implementations, the certificate authority logs information regarding the computerized devices provisioned while disconnected from the SCMS.

In some implementations, the certificate authority transmits the logged information to the SCMS after reconnecting to the SCMS after being disconnected from the SCMS.

In some implementations, the SCMS is operable to determine from the logged information whether the certificate authority performed an unauthorized provisioning while disconnected from the SCMS.

In some implementations, the SCMS is operable to connect to a plurality of certificate authorities.

In various embodiments, a method for securely providing certificates includes: generating, by a security credential management system (SCMS), digital assets; conditionally transmitting, by the SCMS, the digital assets; receiving, by a certificate authority communicatively connected to the SCMS by a communication network, the digital assets from the SCMS; and securely provisioning, by the certificate authority, a plurality of computerized devices based on the received digital assets. The certificate authority intermittently connects to the SCMS to receive the digital assets, the certificate authority is operable to securely provision the plurality of computerized devices while disconnected from the SCMS, and the provisioning by the certificate authority while disconnected from the SCMS is limited by a policy associated with the certificate authority.

In some implementations, the certificate authority is located at the site of a device manufacturer; and the SCMS is remote from the device manufacturer.

In some implementations, the policy limits the provisioning by the certificate authority while disconnected from the SCMS according to a time of disconnection from the SCMS.

In some implementations, the certificate authority logs information regarding the computerized devices provisioned while disconnected from the SCMS, and the certificate authority transmits the logged information to the SCMS after reconnecting to the SCMS after being disconnected from the SCMS.

In some implementations, the SCMS is operable to determine from the logged information whether the certificate authority performed an unauthorized provisioning while disconnected from the SCMS.

In some implementations, the SCMS is operable to connect to a plurality of certificate authorities.

In various embodiments, a non-transitory computer-readable medium securely providing certificates, the non-transitory computer-readable medium comprising a plurality of instructions that, in response to execution by a processor, cause the processor to perform operations including: generating, by a security credential management system (SCMS), digital assets; conditionally transmitting, by the SCMS, the digital assets; receiving, by a certificate authority communicatively connected to the SCMS by a communication network, the digital assets from the SCMS; and securely provisioning, by the certificate authority, a plurality of computerized devices based on the received digital assets. The certificate authority intermittently connects to the SCMS to receive the digital assets, the certificate authority is operable to securely provision the plurality of computerized devices while disconnected from the SCMS, and the provisioning by the certificate authority while disconnected from the SCMS is limited by a policy associated with the certificate authority.

In some implementations, the certificate authority is located at the site of a device manufacturer; and the SCMS is remote from the device manufacturer.

In some implementations, the policy limits the provisioning by the certificate authority while disconnected from the SCMS according to a time of disconnection from the SCMS.

In some implementations, the certificate authority logs information regarding the computerized devices provisioned while disconnected from the SCMS, and the certificate authority transmits the logged information to the SCMS after reconnecting to the SCMS after being disconnected from the SCMS.

In some implementations, the SCMS is operable to determine from the logged information whether the certificate authority performed an unauthorized provisioning while disconnected from the SCMS.

Some implementations process, in a similar manner to enrollment certificates, other types of digital assets, for example other types of certificates, such as pseudonym certificates, application certificates, etc. For example, pseudonym certificates are provisioned or installed in the OBU (or other computerized device) after the enrollment certificate is installed, and various embodiments of the DDA can obtain batches of pseudonym certificates, store the pseudonym certificates, and then install/provision the pre-generated pseudonym certificates to OBUs at the appropriate time, including when the connection between the DDA and the provisioning controller/head end is not operating.

DESCRIPTION OF THE DRAWINGS

The accompanying drawings, which are incorporated into and constitute a part of this specification, illustrate embodiments of the invention and together with the description, serve to explain the principles of the invention.

FIG. 4 is a flow chart showing an exemplary method consistent with embodiments of the invention.

DETAILED DESCRIPTION

Figure 1:
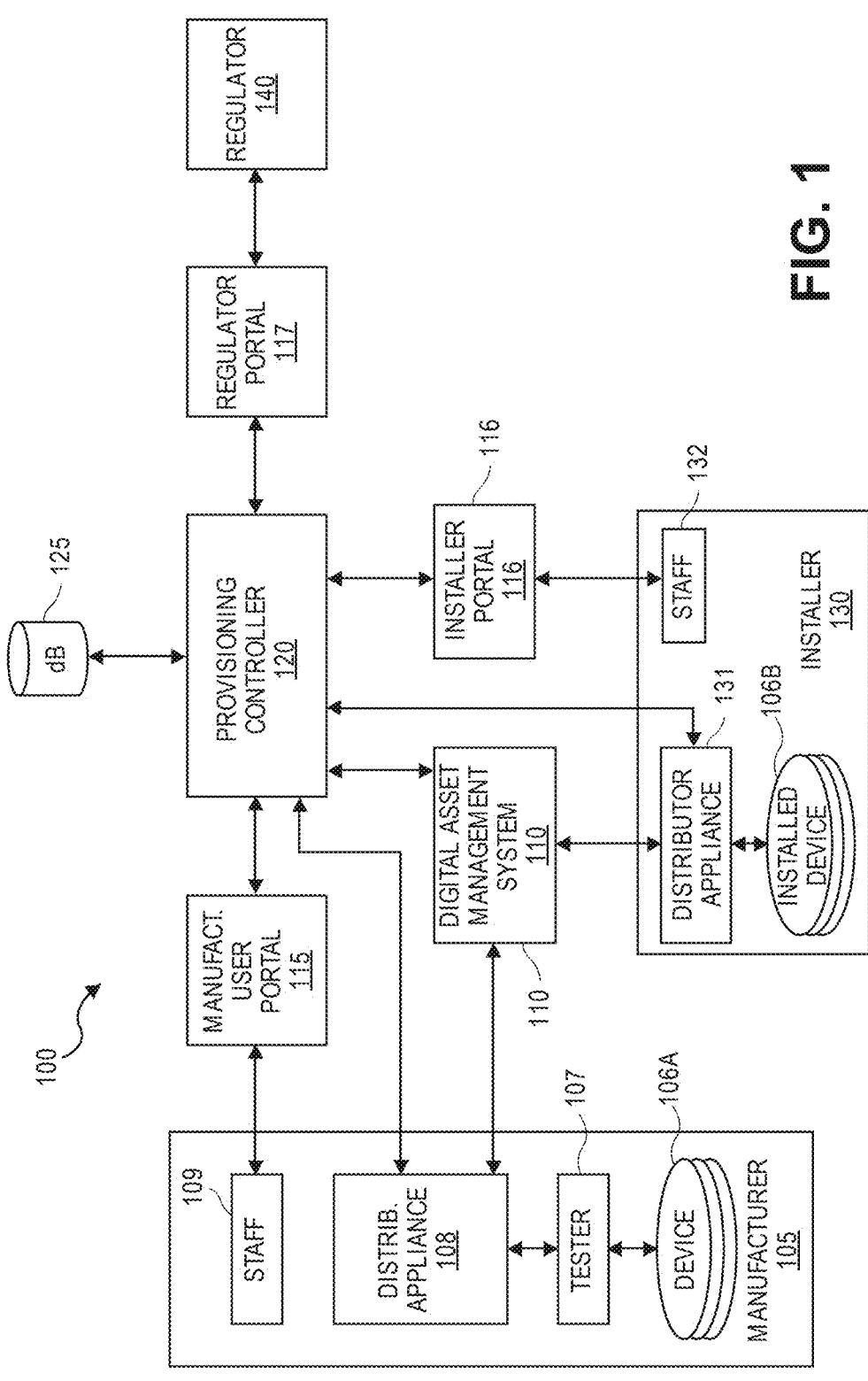
FIG. 1 is a block diagram showing an example of a system for secure provisioning, consistent with implementations of the invention.

Reference will now be made in detail to various implementations of the invention, examples of which are illustrated in the accompanying drawings. Wherever convenient, the same reference numbers will be used throughout the drawings to refer to the same or like parts.

In order to ensure safe and proper operation in the field, embedded devices, for instance, the Electronic Control Unit (ECUs) used in vehicles, need to be properly initialized during manufacturing by provisioning digital assets, such as security assets. Digital assets could include various cryptographic keys, a unique identifier, digital certificates, and software. In most cases, the origin of these digital assets and manufacturing factories are located in different geographical locations, which are conventionally interconnected via insecure Internet communications. It is therefore desirable to create an end-to-end secure channel from the origin of these digital assets to the device, such that the digital assets cannot be accessed or modified by malicious parties or by accident.

There are drawbacks to traditional network security protocols for end-to-end protection, such as TLS/SSL, in that they require either pre-shared keys or certain secret security materials to pre-exist at both communicating parties. This creates a cyclic technical problem in that, in order to provision digital assets, some initial secret materials must pre-exist. This problem includes how to protect the initial secret materials. This problem is especially acute for computerized devices because, to simplify logistics, typically a single version of the initial software is loaded on the computerized device during manufacturing. If this initial software must contain initial security materials, this requires a global secret to exist. As a consequence, compromising the initial security materials will lead to compromise of all digital assets provisioned on all devices, as they all share the same global secret. Systems, methods and devices consistent with the present disclosure address these and other problems of conventional provisioning systems.

Provisioning generally refers to the set of actions taken to prepare a computerized device with appropriate data and software. It may also include the set of actions taken to properly install the device in its operational environment, making it ready for operation. The actions include loading the appropriate digital assets (e.g., operating system, device drivers, middleware, applications, digital certificates, and the like) into a digital storage (e.g., memory) of the device, and appropriately customizing and configuring certain digital assets on the device (if needed), which digital assets may be unique to each particular device. The actions may also include verifying that the computerized device is a legitimate device created by a legitimate device manufacturer, and not a copy or a counterfeit device.

The actions may also include correctly installing the device into its operational environment and testing it to verify that it is operating properly. The ability to securely provision only known-to-be-good devices is complicated by the fact that the devices may be built by one manufacturer and later installed by another into a larger system or device—for example an On Board Unit (OBU) built by a component manufacturer may be installed into a car built by the car manufacturer. An improperly installed device may function incorrectly.

Various implementations consistent with the present invention provide secure provisioning of computerized devices, including IoT devices. Such implementations serve to prevent or inhibit the malicious, negligent, or mistaken tampering, altering, updating, or releasing of digital assets that are used by the computerized devices, and prevent or inhibit the improper installation of the computerized devices and their software.

Various implementations consistent with the present invention may also produce audit logs, records, reports, and the like, of the secure provisioning process, which may be used to analyze and resolve later-discovered problems.

Various implementations consistent with the present invention may also provide a secure provisioning and management platform, which may be provided as a service to device and system manufacturers.

FIG. 1 is a block diagram showing an example of a system 100 for secure provisioning of computerized devices, consistent with implementations of the invention. As shown in the example of FIG. 1, the system 100 includes a provisioning controller 120. The provisioning controller 120 may be implemented as a server computer (e.g., having at least one processor and associated memory) with an embedded hardware security module (HSM) that securely generates and stores digital security assets and that securely performs a variety of cryptographic and sensitive computations. The HSM protects digital security assets, such as cryptographic keys, and other sensitive data from possible access by an attacker. In various implementations, the provisioning controller 120 functions to authenticate and securely communicate with users of the system 100; securely communicate with and manage one or more distributor appliances 108, 131; securely communicate with and direct the operations of a digital asset management system (DAMS) 110; create and store provisioning records; create, store and distribute provisioning records; create, store and distribute audit logs; create and distribute certificates to cryptographically bind together the DAMS 110 and distributor appliance 108, 131 elements; revoke users and managed devices as needed if they cease to be trusted; and create and distribute secure encrypted backups of critical keys and data for offsite storage for business continuity and disaster recovery. In embodiments, the distributor appliance 108 may be an instance of a Device Lifecycle Management Distribution Appliance (DDA).

As shown in the example of FIG. 1, the provisioning controller 120 is communicatively connected to a database 125, which may store data, information, and digital assets related to securely provisioning the devices 106a, 106b, (which may be collectively referred to as 106).

The provisioning controller 120 is also securely communicatively connected to a manufacturer's user portal 115, which may be implemented, e.g., as a server or as an interface to the provisioning controller 120. In various implementations, the staff 109 of a device manufacturer 105 may use the manufacturer's user portal 115 to interface with the provisioning controller 120 (and thus the DAMS 110) and manage their device provisioning activities. In various implementations, the manufacturer's user portal 115 may collect identifying information from a staff user 109, such as username, password, two-factor identification data, a facial recognition image, a fingerprint, etc., and provide the identifying information to the provisioning controller 120. The provisioning controller 120 may authenticate the staff 109 before allowing the staff 109 to access the secure provisioning system 100. For example, the provisioning controller 120 may look up identifying information that is associated with the staff user 109 and that was previously verified and stored in its database 125, and compare the stored identifying information to the identifying information collected by the manufacturer's user portal 115. Alternatively, the provisioning controller 120 or the DAMS user portal 115 may be integrated with a user's enterprise identification and authentication system, which will determine if the staff 109 are authorized to use the system 100. In various implementations, the provisioning controller 120 or the DAMS user portal 115 may apply roles to the successfully authenticated staff 109 to constrain their actions within the system 100. In some implementations, the provisioning controller 120 may allow access only if the two sets of identifying information match.

Similarly, the provisioning controller 120 is also communicatively connected to an installer user portal 116, which may be implemented, e.g., as a server or as an interface to the provisioning controller 120. In various implementations, the staff 132 of a device installer may use the installer user portal 116 to interface with the provisioning controller 120 (and thus the DAMS 110) and manage their device installation and provisioning activities. The provisioning controller 120 may authenticate the staff 132 before allowing the staff 132 and assign them roles before allowing the staff 132 to access the secure provisioning system 100 and perform authorized functions on the system.

Also similarly, the provisioning controller 120 is also communicatively connected to a regulator portal 117, which may be implemented, e.g., as a server or as an interface to the provisioning controller 120. In various implementations, a regulator 140, once authenticated by the provisioning controller 120, may use the regulator portal 117 to interface with the provisioning controller 120 and manage the review and approval of manufacturers 104, installers 130, devices 106, and/or the software/digital assets that are installed in the devices 106. The provisioning controller 120 may authenticate the regulator 140 before allowing the regulator 140 to access the secure provisioning system 100. In some implementations of the system 100, the regulator 140 and the regulator portal 117 are optional.

The provisioning controller 120 is further communicatively connected to the DAMS 110. In various implementations, the DAMS 110 may be implemented as a server, a device, or a system of secure appliances and/or servers. The DAMS 110 securely retrieves the public keys from the end entity devices to be provisioned, via the distributer appliances 108, 131, or other secure and authenticated connection, and securely supplies the digital certificates and related data that are installed in the devices 106. In addition, the DAMS 110 securely receives, via the distributor appliances 108, 131, status information about the provisioning, installation, functionality, etc. of the computerized devices 106 from the manufacturer 105 and the installer 130. In addition, the DAMS 110 may perform this provisioning at a single site or at multiple sites as shown in FIG. 1. As explained in more detail with respect to FIG. 2, the DAMS 110 may include the following main elements: a root certificate authority (CA), a policy generator, a CRL generator, a misbehavior authority, an intermediate CA, an enrollment CA, a linkage authority, a pseudonym CA, and a registration authority.

The DAMS 110 adds new functionality and improves upon the components and functionality described in the paper "A Secure Credential Management System for V2V Communications" by William Whyte et al., 2013 IEEE Vehicular Networking Conference, December 2013. In various implementations, the DAMS 110 includes multi-stage programming and flexible management, (e.g., allowing the inclusion of regulators 140). Various implementations of the DAMS 110 also enable the ability to allow a single DAMS 110 to provide different levels of provisioning to different subscribers. Various implementations of the DAMS 110 also enable the ability to allow subscribers to assign different digital certificate usages during a time period (e.g., per week) as well as different certificate loads (such as one week, instead of three years as in conventional systems). Various implementations of the DAMS 110 may also provide subscriber-specific URLs so that a specific manufacturer's computerized device 106 (e.g., an OEM's vehicles) can securely connect with infrastructure systems (such as the manufacturers telematics systems and a hosted interface to the SCMS) after manufacturing.

As shown, the provisioning controller 120 is also communicatively connected to the distributor appliances 108, 131. In various implementations, a distributor appliance 108, 131 may be implemented as a standalone secure appliance installed at the company premises (as shown) or as a web or cloud service, among other things. In various implementations, the distributor appliance 108, 131 is realized as a trusted endpoint device that securely transmits and receives digital assets and other information to and from the DAMS 110 and the provisioning controller 120, preferably via dedicated, non-Internet communications channels. As shown, a distributor appliance 108, 131 also connects, either directly or indirectly, with a device 106a, 106b, in order to download digital assets to, and receive data from, the device 106a, 106b. In various implementations, the distributor appliance 108, 131 can be implemented as box including a server computer (e.g., having at least one processor and associated memory) with a hardware security module (HSM), a hardened operating system (OS), an internal firewall and an internal host intrusion detection/prevention system. The distributor appliance may be specifically designed to operate in untrusted environments yet still provide trusted and reliable operation. The distributor appliance has a secure communications channel(s) between itself and the secure provisioning controller 120 and the DAMS 110. This channel is used to control the distributor appliance and to send and retrieve provisioning-related data and log information. The distributor appliance also may have a secure communications channel to the tester 107 used to program or provision the device 106. This channel protects provisioning data and log data from being revealed or modified on the manufacturing location's communication network. The distributor appliance 108 may also establish a secure communications channel directly with the device 106 to be programmed so that the provisioning data cannot be compromised or modified by a third party (including a rogue tester 107). In various implementations, the distributor appliance may collect public keys and other data, such as microprocessor serial numbers, from the devices 106 it is to provision. It may send this information to the provisioning controller 120 and/or the DAMS 110. It may also accept data and commands and other information from the provisioning controller 120 and/or the DAMS 110 to program into the device 106. It may return its own log data and it may return data from the tester 107 to the provisioning controller 120 and/or the DAMS 110.

As shown with respect to the device manufacturer 105, the distributor appliance 108 may be communicatively connected to a tester 107, (e.g., a computerized manufacturing apparatus, a product testing device, or the like), which is in turn connects to the device 106a that was produced by the manufacturer 105, such as an OBU device. The manufacturer 105 may include or be a factory that manufactures and/or supplies computerized devices 106a to the market. As one of many possible examples, the computerized device 106a may be an embedded Universal Integrated Circuit Card (eUICC), which is used in cellular modems for telecommunications, incorporated as part of an On Board Unit (OBU) that is later installed in a car, for communications between cars and transportation infrastructure devices. It could also be the V2V secure microprocessor installed in an OBU for communications with other vehicles and Road Side Units (RSU). These newly manufactured devices 106a must be properly provisioned with digital assets, for example, digital certificate(s) from the DAMS 110, in order to operate properly. The staff 109 of the manufacturer 105 may use the user portal 115 to interact with the provisioning controller 120 and manage the product provisioning activity by the DAMS 110.

As shown with respect to the installer 130, the distributor appliance 131 may alternatively be communicatively connected directly to the device 106b, while or after the device 106b is installed in its operating environment. The installer 130 may include or be a factory or shop that installs computerized devices 106b into their operating environment—for example, installs OBUs into cars. At installation, the computerized devices 106b must be further properly provisioned with digital assets, for example, additional digital certificate(s) from the DAMS 110, in order to operate properly. The staff 132 of the installer 130 may use the installer user portal 116 to interact with the provisioning controller 120 and manage the product provisioning activity by the DAMS 110.

In various implementations, the provisioning controller 120, the distributor appliances 108, 131, and the DAMS 110 may have secure, non-publicly accessible communications links or channels between them, and in various embodiments, all of the communication links shown in FIG. 1 may be secure, non-publicly accessible communication channels. In various implementations, these secure channels are encrypted and mutually authenticated to prevent unauthorized end points from communicating within this secure infrastructure. Multiple security mechanisms may be used to protect these communications channels so that if the outer layer is somehow compromised, the inner layer will remain secure. As an example, a mutually authenticate TLS tunnel may be used as the outer layer with the inner layer using another protocol such as a proprietary secure communications protocol. These secure connections between the infrastructure components comprising system 100 are used for protecting the sensitive communications between the components and ensuring their correct operation. Using these secure paths, the provisioning controller 120 and the DAMS 110 can send digital data between components without concern that it will be compromised or modified in transit. Command and control information may be also passed over these channels. For instance, the provisioning controller 120 can control to which distributor appliance 108, 131, certain digital assets and data are sent. It can also instruct the distributor appliances 108, 131 how to meter out this data to devices 106 on the manufacturing line that it is provisioning. Further, the distributor appliances 108, 131 can report information back to the provisioning controller 120 without concern that it will be compromised or modified in transit. For example, the secure provisioning controller 120 can program the distributor appliance 108, 131 to provision up to 10,000 devices with any type of digital asset—e.g., certificates, software, fuse contents, etc. The distributor appliance 108, 131 can count the devices it is provisioning and when it reaches its limit, it will report that to the provisioning controller 120. In various implementations, the devices (e.g., 108, 110, 131, 115, 116, 117) that are managed by the provisioning controller 120 include functionality that causes them to cease to operate if they do not regularly communicate with the provisioning controller 120; thus if they are stolen then they become useless. This functionality prevents lost/stolen devices from continuing to operate and to provision devices 106 as if they were still located in the proper manufacturing environment.

Continuing to refer to the example shown in FIG. 1, in operation the distributor appliance 108 located at the manufacturer 105 securely receives digital assets from the DAMS 110 and supplies them to the tester 107 for the device 106a. As each device 106a is manufactured by the manufacturer 105, the tester 107 communicates with the device 106a to get information from the device 106a, such as its unique identification number and status, and to download or otherwise install the digital assets into the device, such as digital certificates. The tester 107 may also supply information (e.g., provisioning status) from the device 106a to the distributor appliance 108, which securely communicates that information to the DAMS 110 and/or the provisioning controller 120. In some implementations, the tester 107 may include a software transportation layer security (TLS) agent that securely transports data between the distributor appliance 108 and the device 106a, which in effect creates a secure encrypted communication path between the DAMS 110 and the device 106a via the distributor appliance 108 and the tester 107, using an ephemeral key associated with each device 106a.

After it is initially provisioned, the manufacturer 105 ships the device 106a to the installer 130, which installs the device 106b. In various implementations, before initial provisioning, the device 106a is nonfunctional; and after initial provisioning by the manufacturer 105, the device 106a is not yet fully functional although it can partially function. In such implementations, the initial provisioning makes the device functional only to the extent needed for installation and further final provisioning, which is required to make it fully operational.

The installer 130 installs the device 106b into its operational environment, and a staff member 132 of the installer 130 notifies the provisioning controller 120 of that fact via the installer portal 116. This notification attests that the installation was properly completed and preferably includes information uniquely identifying the device 106b to the provisioning controller 120. In some implementations, the distributor appliance 131 may automatically notify the provisioning controller 120 after querying the device 106b for status and identification information. In various implementations wherein the installer 130 attests via the Installer portal 116 that he has properly installed the device 106b, this attestation may be logged/saved into the database 125 by the provisioning controller 120. The attestation may include specific test data related to each particular installed device 106b, such as a radio transmit power measurement or a verification of a GPS antenna location.

In response to the installation notification, the provisioning controller 120 verifies that (i) the device 106b is listed in its database 125 as a device that was legitimately manufactured by the manufacturer 105, (ii) the device 106b is listed in its database 125 as having been successfully initially provisioned by the manufacturer 105, and (iii) the installer 130 is listed in its database 125 as an authorized installer. If this verification is successful, the controller 120 directs the DAMS 110 to send the digital assets (e.g., Pseudonym Certificates (PCs)) and/or other information needed to operationally provision the device 106*b*, such that the device 106*b* can properly function as installed in its operating environment.

In various implementations, the regulator 140, via the regulator portal 117, interacts with the provisioning controller 120 to identify, verify, and manage installers 130 and/or manufacturers 105, such that unauthorized installers (e.g., hackers) cannot obtain authentic digital assets from the system 100. The staff members of the regulator 140 may be authenticated by the provisioning controller 120 and may have unique IDs with the system 100 so that their actions can be uniquely logged. In various implementations, the regulator 140 can use the regulator portal 117 to query the provisioning controller 120 to obtain copies and reports of information logged by the controller 120, such as attestation reports, installer actions, number and identity of manufactured devices 106*a*, number and identity of installed, fully provisioned devices 106*b*, and the like.

In various implementations, the installer 130 must be authenticated as authorized by the provisioning controller 120 in order to interact with the system 100. To become authorized, the installer 130 may, for example, have to execute the appropriate contractual documents stating they will properly install the devices 106*b* in the target environment (e.g., target vehicle or site or the like). The installer 130 may, for example, be required to attest to other contractual elements by the regulator 140. Preferably, each installer 130 has a unique ID within the system 100 such that their actions can be uniquely logged by the provisioning controller 120.

The described implementations of the system 100 and its functionality ensures that only devices 106 that have been manufactured by the manufacturer 105 and properly installed and tested by and authorized installers 130 are fully provisioned with the digital assets needed to make the devices 106 operational. The provisioning controller 120 produces extensive logs and reports for what actions are taken by whom at each stage in the provisioning process, providing a critical audit capability that has not existed with conventional systems.

One of ordinary skill will recognize that the components, processes, data, operations, and implementation details shown in FIG. 1 are examples presented for conciseness and clarity of explanation. Other components, processes, implementation details, and variations may be used without departing from the principles of the invention, as this example is not intended to be limiting and many variations are possible. For example, although only one manufacturer 105, only one installer 130 and only one regulator 140 are shown in FIG. 1, other implementations may have any number of each of these entities. For another example, although the DAMS 110 and provisioning controller 120 are shown as separate devices, other implementations may combine their functionality into a single device, e.g., a single server. As yet another example, the same may be done for the portals 115-117. For yet another example, the system 100 could additionally include an asset management appliance (AMA, not shown), as described in the incorporated-by-reference U.S. Provisional Application No. 62/421,852 filed on 14 Nov. 2016. In such an implementation, the AMA may be communicatively connected to the provisioning controller 120 and/or the distributor appliances 108, 131 and/or DAMS 110. In various implementations, the AMA may include a user-friendly GUI and functionality that allows production coordinators to easily and efficiently manage product (e.g. device 106) configurations and builds, and that allows asset owners to easily and efficiently manage inventories of digital assets.

Various embodiments and implementations consistent with the invention provide systems, components, methods, and computer program products for offline or remote generation and provisioning of digital assets, such as digital certificates, at a communicatively isolated site. In some embodiments, the system may comprise a certificate authority (CA) (e.g., an enrollment CA) that is added to/implemented in a distribution appliance (e.g., 108, 131, 240, also called a distributor appliance in the related application) or a distribution appliance pair, such that the distribution appliance/distribution appliance pair can operate uninterrupted/independently when disconnected, e.g., temporarily disconnected, from a communications network.

In some embodiments, the improved distribution appliance (e.g., Device Lifecycle Management Distribution Appliance (DDA) 240) intermittently connects to any SCMS (e.g., to the head end) and transmit information to ensure provisioned materials (e.g., certificates produced by the improved distribution appliance) are logged and tracked and the like.

In some embodiments, the enrollment model for newly manufactured devices is changed such that the distribution appliance (e.g., DDA 240) can operate fully offline without any dependency on an active network connection. This novel enrollment model only requires periodic network access (e.g., every 24, 48, or 72 hours, or the like) to continue production of computerized devices (e.g. 106). In some such embodiments, the distribution appliance may typically operate with an active communication connection, e.g. to the SCMS head end, but the new functionality allows the distribution appliance to operate offline/disconnected for a certain period, such 24, 48, or 72 hours, or the like, without developing problems stemming from disconnection.

Among others, a benefit of this improvement is the distribution appliance will continue to operate when communications are interrupted for predefined periods of time or less. Thus, production lines, and especially high-volume production lines, will have continuous uptime during communications interruptions, and the distribution appliance can function with only occasional communications to the SCMS head end, e.g., to share logs, state and keying materials for reporting, and the like.

In some embodiments, the existing Application Programing Interface (API) (e.g., Representational State Transfer (REST) API) between the manufacturer production system (e.g., 107, 105, 132) and the distribution appliance (e.g., 240, 108,131) remains unchanged. This provides a technical advantage, in that the manufacturer's production system operates the same as always, regardless of any changes to the distribution appliance and/or the enrollment model.

In various embodiments, the systems, methods, devices and computer-program products described herein utilize the trusted relationship between a distribution appliance (e.g., 240, 108, 131) and the SCMS (e.g., the Digital Asset Management System (DAMS) 110) to securely move crypto key material from one system to another along with a management policy that is enforced by the distribution appliance, for example, within the security perimeter of the HSM of the distribution appliance. Using this mechanism, embodiments consistent with the present disclosure safely move an Enrollment Certificate Authority (ECA) signing key down to the distribution appliance, where the distribution appliance can locally sign new enrollment requests. Various embodiments employ a policy associated with this key that will limit the period of time that it can operate independently and/or the number of devices/units that can be provisioned independently, and it will be required to report back to the SCMS, or a like system, with details on all of the operations that it performed with the key while offline. In some embodiments, the policy is defined such that the DDA 240 only requires network access infrequently, e.g., once every 24, 48, or 72 hours (or the like), to continue operating normally. This, for example, allows for continued production by a manufacturer or the like (e.g., 105, 103), even when there is a network/communications interruption that lasts a day or two.

In some embodiments, the Enrollment Certificate Authority (ECA) signing key may be securely transferred from one FIPS 140-2 Level 3 certified Hardware Security Module (HSM) to another using a cryptographic handshake. The key is never exposed outside of a secure environment and the status of the key is managed by policies that are enforced within the HSM. This is a unique capability of the distribution appliance architecture.

As noted above, in various embodiments, the REST interface between the manufacturer systems (e.g., 105, 130) and the DDA 240 may be unchanged relative to the interface before the innovations of the present disclosure. Among other technical advantages, the innovations of the present disclosure may eliminate the external network dependency for at least a certain period of time and may allow continued operation of the distribution appliance during a network interruption that lasts up to a certain period of time, such 24 hours, 48 hours, etc.

Figure 2:
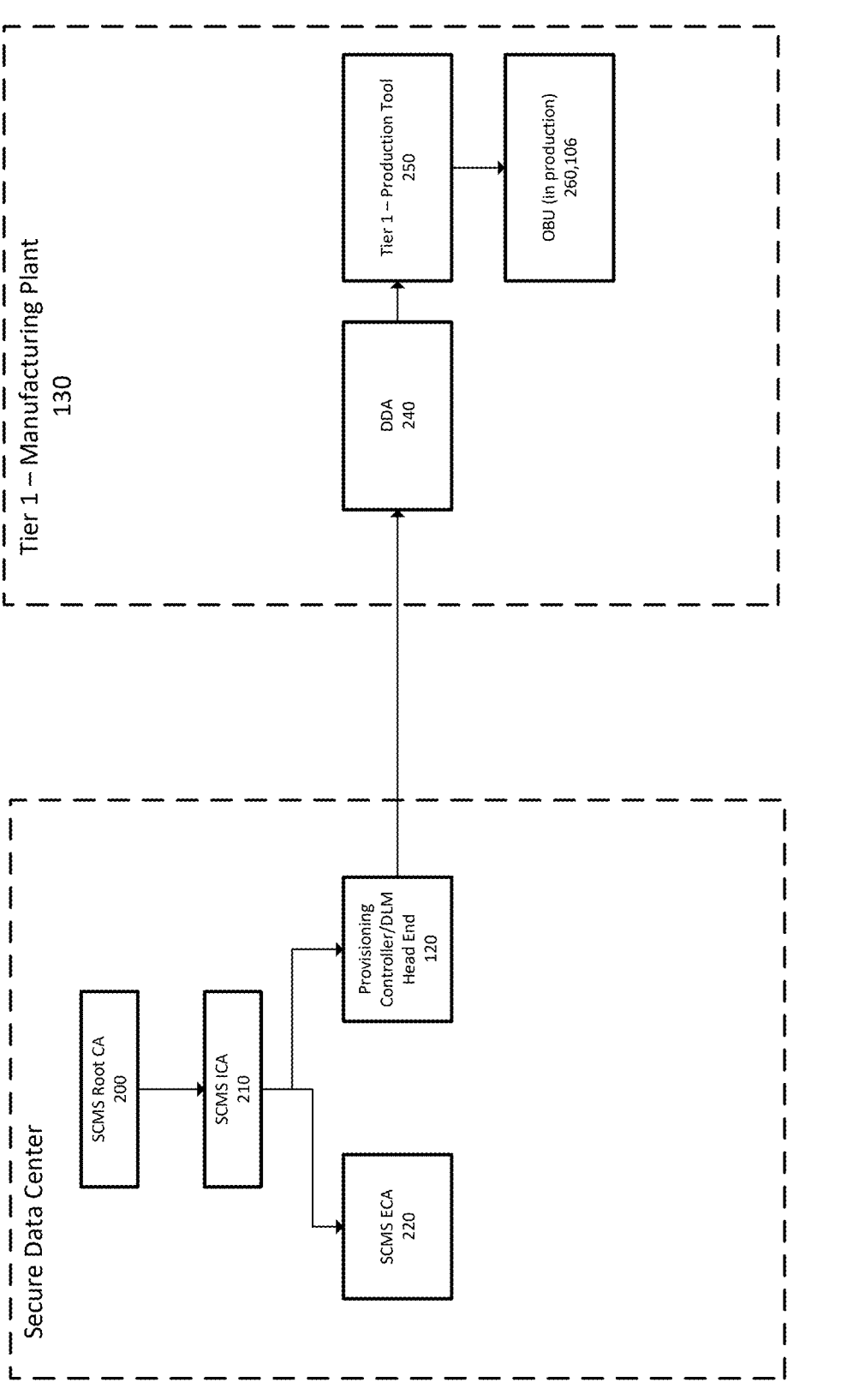
FIG. 2 is a block diagram showing an example of an architecture for a system for offline digital asset generation and provisioning, consistent with embodiments of the invention.

FIG. 2 is a block diagram showing an example of an architecture for a system for offline digital asset generation and provisioning, consistent with embodiments of the invention.

Figure 3:
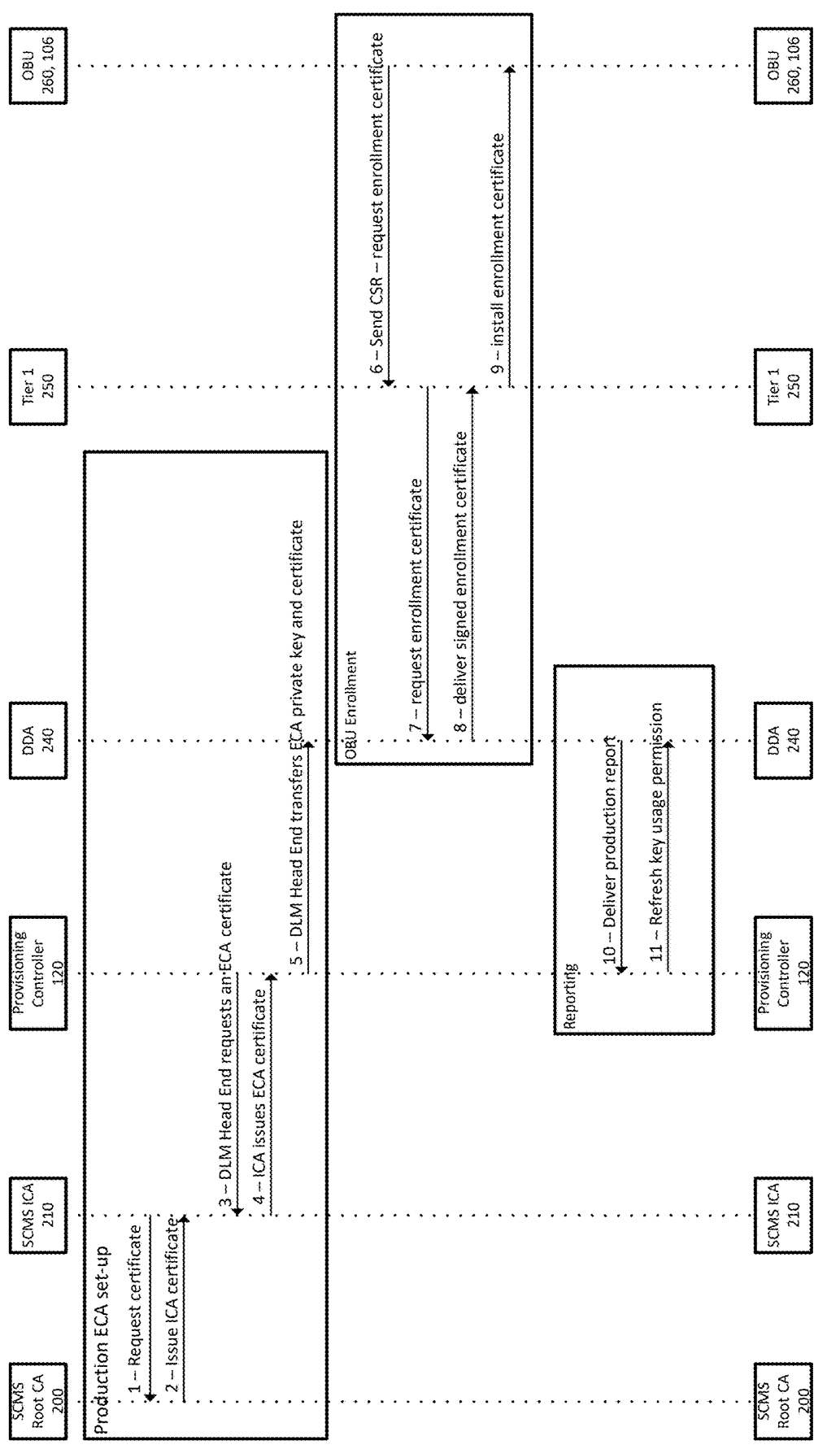
FIG. 3 is a sequence diagram showing an example of a process for offline digital asset generation and provisioning, consistent with embodiments of the invention.

In the example of FIG. 2, the SCMS Root Certificate Authority (CA) 200 is used to authorize the SCMS Intermediary Certificate Authority (ICA) 210 to provision new devices as enrollment authorities (1 and 2 in FIG. 3). The SCMS ICA 210 is then used to sign certificates that authorize an SCMS Enrollment Certificate Authority (ECA) 220. This unit acts as a traditional SCMS Enrollment CA (ECA), which can be used to directly sign enrollment certificates for new devices (e.g., 260, 106, 106A).

In various embodiments consistent with the invention, the provisioning controller 120, for example, a Device Lifecycle Management (DLM) Head End 110 can also generate a crypto key pair and request an ECA certificate from the SCMS ICA 210 (3 and 4 in FIG. 3). In this case, the provisioning controller 120 will apply a special policy to the new key pair that requires that it can only be used when deployed in a distribution appliance (e.g., 240, 108, 131), for example, the DDA 240, for example, a DLM Distribution Appliance (DDA). Later, the provisioning controller 120 will distribute the ECA private key and certificate to a DDA 240 (108, 131) (5 in FIG. 3). This transfer may be performed as a secure transaction in various embodiments. In various embodiments, the private key is encrypted during transfer, so that the private key is never available in plaintext outside of secure appliance.

During production, a device (e.g., 260, 106), such as an On-Board Unit or OBU 260, that is being produced will be connected to a Tier-1 Production Tool 250, such as a tester 107. As part of the production workflow, the OBU 260 will produce a Certificate Signing Request (CSR) as a way of requesting a new enrollment certificate (6 in FIG. 3). The Tier-1 Production Tool 250 will deliver the CSR to the DDA 240 (7 in FIG. 3), for example, using a REST interface. In various embodiments consistent with the present disclosure, the DDA 240 will use the private key and ECA certificate that it received from the provisioning controller 120 to sign the CSR and produces an OBU enrollment certificate for the requesting OBU 260 (8 in FIG. 3). Thus, the DDA 240 functions to produce requested, valid enrollment certifications without being in communication with the SCMS (e.g., via the provisioning controller 120), and it does not matter whether or not the communications link/network between the Tier 1 manufacturing plant 130 and the secure data center, (e.g., between the DDA 240 and the provisioning controller 120) is operational, because the novel DDA 240 is configured to produce the certificates without using the communications link/network and without using the secure data center.

One of ordinary skill will recognize that the SCMS components are merely examples, and that any type of SCMS components from any provider may be used without departing from the principles of the present disclosure.

FIG. 3 is a sequence diagram showing an example of a process for offline digital asset generation and provisioning, consistent with embodiments of the invention.

As shown in the example of FIG. 3, during vehicle production, a newly produced OBU 260, 106 requests an enrollment certificate (6 in FIG. 3). The request is forwarded by the Tier 1 production tool 250 (e.g., 107) to the on-site DDA 240. The DDA 240 uses the enrollment private key to sign the request and returns the signed enrollment certificate (8 in FIG. 3). The Tier 1 manufacturing tool 250 then installs the signed enrollment certificate in the newly produced OBU 260 (9 in FIG. 3). This sequence repeats for each newly produced OBU. Thus, the DDA 240 functions to produce requested, valid enrollment certifications (7 and 8 in FIG. 3) without being in communication with the SCMS (e.g., via the provisioning controller 120 of FIG. 2), and it does not matter whether or not the communications link/network between the DDA 240 and the SCMS/DAMS 110 is operational.

After step 9 in FIG. 3, the OBU 260 will download an authorization (pseudonym) certificate from a related or separate system.

As shown in the example of FIG. 3, after a period of time (such as 1 day) during which the communications link/network between the DDA 240 and the provisioning controller 120 may have been nonoperational, the DDA 240 delivers a production report to the DAMS 110 (10 in FIG. 3). The provisioning controller 120 will confirm that all policies have been properly applied and perhaps grant permission for continued operation to the DDA 240 (11 in FIG. 3). If this step is not completed, then a local policy on the DDA 240 will prevent further use of the ECA private key, in various embodiments consistent with this disclosure.

As noted above, various embodiments may implement policy constraints. For example, the provisioning controller 120 can enforce policy constraints that limit how the ECA private key can be used within the provisioning controller 120 and with the DDA 240. Specifically, the DDA 240 can be granted use of the ECA private key for a limited period of time, such as 48 hours or the like, and/or for a limited number of devices/units that can be provisioned. For another example, during that period of time, the provisioning controller 120 may issue permission for the DDA 240 to extend operation for an additional 48 hours. This refresh may be configured to happen after a period of 24 hours. During normal operation, the DDA 240 has continuous access to the ECA private key.

In various embodiments, in the event that the DDA 240 is unable to contact the provisioning controller 120 (e.g., if the communications network between the two remains nonoperational for a long period of time), then the DDA 240 policy will prevent further access to the ECA private key after the allowed time expires and/or after the number of devices/units that can be provisioned independently is reached. Once this happens, network connectivity between the DDA 240 and provisioning controller 120 must be re-established in order to activate or reactivate the ECA private key in the DDA 240.

FIG. 4 shows a flow chart representing an exemplary method in accordance with embodiments of the disclosure. In step 410, a security credential management system (SCMS) generates digital assets. In step 420, the SCMS conditionally transmits the digital assets. In step 430, a certificate authority communicatively connected to the SCMS receives, by a communication network, the digital assets from the SCMS. In step 440, the certificate authority securely provisions a plurality of computerized devices based on the received digital assets. In step 450, the certificate authority securely communicates log information to the SCMS with an accounting of all certificates installed.

Although many of the examples disclosed herein are presented in the context of enrollment certificates, the invention is not limited to enrollment certificates. Embodiments consistent with the invention can process, in a similar manner to enrollment certificates, other types of digital assets, for example other types of certificates, such as pseudonym certificates, application certificates, etc. For example, as noted, pseudonym certificates are provisioned or installed in the OBU 260 (or other computerized device) after the enrollment certificate is installed, and various embodiments of the novel DDA 240 can obtain batches of pseudonym certificates, store the pseudonym certificates, and then install/provision the pre-generated pseudonym certificates to OBUs 260 at the appropriate time, including when the connection between the DDA 240 and the provisioning controller/head end 120 is not operating.

In general, the various methods, operations, and functions described herein may be performed, at least partially, by one or more virtual machines (VMs). In additional or alternative implementations, the operations of the applications described herein may be performed, at least partially by one or more processors that are temporarily configured (e.g., by software) or permanently configured to perform the relevant operations. Whether temporarily or permanently configured, such processors may constitute processor-implemented modules that operate to perform one or more application operations, functions, and roles described herein. As used herein, the term 'processor-implemented module' refers to a hardware module implemented using one or more processors.

Similarly, the processes, functions, and operations described herein may be at least partially processor-implemented, with a particular processor or processors being an example of hardware. For example, at least some of the operations of a function may be performed by one or more processors or processor-implemented modules. Moreover, the processor(s) may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within an office environment, a manufacturing environment, or a server farm). In other example embodiments, the processors or processor-implemented modules may be distributed across a number of geographic locations.

Other embodiments of the invention will be apparent to those skilled in the art from consideration of the specification and practice of the invention disclosed herein. It is intended that this specification be considered as disclosing examples only, with a true scope and spirit of the invention being indicated by the forthcoming claims of the corresponding non-provisional application.

What is claimed is:

1. A system for offline generation of digital assets, the system comprising:
   a security credential management system (SCMS) comprising an electronic processor, wherein the SCMS is operable to generate and conditionally transmit digital assets comprising a certificate authority signing key; and
   a certificate authority comprising an electronic processor and communicatively connected to the SCMS by a communication network, the certificate authority being operable to receive the digital assets from the SCMS;
   wherein the certificate authority is operable to securely provision a plurality of computerized devices based on the received digital assets by producing signed enrollment certificates using the certificate authority signing key,
   wherein the certificate authority intermittently connects to the SCMS to receive the digital assets,
   wherein the certificate authority is operable to securely provision the plurality of computerized devices while disconnected from the SCMS, and
   wherein the provisioning by the certificate authority while disconnected from the SCMS is limited by a policy associated with the certificate authority.

2. The system of claim 1, wherein the certificate authority is a distribution appliance located remotely from the SCMS.

3. The system of claim 1, wherein the SCMS comprises a provisioning controller.

4. The system of claim 1, wherein the certificate authority is located at the site of a device manufacturer, and
   wherein the SCMS is remote from the device manufacturer.

5. The system of claim 1, wherein the policy limits the provisioning by the certificate authority while disconnected from the SCMS according to a time of disconnection from the SCMS.

6. The system of claim 1, wherein the policy limits the provisioning by the certificate authority while disconnected from the SCMS according to a number of the computerized devices provisioned.

7. The system of claim 1, wherein the certificate authority logs information regarding the computerized devices provisioned while disconnected from the SCMS.

8. The system of claim 7, wherein the certificate authority transmits the logged information to the SCMS after reconnecting to the SCMS after being disconnected from the SCMS.

9. The system of claim 8, wherein the SCMS is operable to determine from the logged information whether the certificate authority performed an unauthorized provisioning while disconnected from the SCMS.

10. The system of claim 1, wherein the SCMS is operable to connect to a plurality of certificate authorities.

11. A method for securely providing certificates, the method comprising:

generating, by a security credential management system (SCMS), digital assets comprising a certificate authority signing key;

conditionally transmitting, by the SCMS, the digital assets;

receiving, by a certificate authority communicatively connected to the SCMS by a communication network, the digital assets from the SCMS; and securely provisioning, by the certificate authority, a plurality of computerized devices based on the received digital assets, wherein the securely provisioning comprises producing signed enrollment certificates using the certificate authority signing key;

wherein the certificate authority intermittently connects to the SCMS to receive the digital assets, wherein the certificate authority is operable to securely provision the plurality of computerized devices while disconnected from the SCMS, and wherein the provisioning by the certificate authority while disconnected from the SCMS is limited by a policy associated with the certificate authority.

12. The method of claim 11, wherein the certificate authority is located at the site of a device manufacturer; and wherein the SCMS is remote from the device manufacturer.

13. The method of claim 11, wherein the policy limits the provisioning by the certificate authority while disconnected from the SCMS according to a time of disconnection from the SCMS.

14. The method of claim 11, wherein the policy limits the provisioning by the certificate authority while disconnected from the SCMS according to a number of the computerized devices provisioned.

15. The method of claim 11, wherein the certificate authority logs information regarding the computerized devices provisioned while disconnected from the SCMS, and wherein the certificate authority transmits the logged information to the SCMS after reconnecting to the SCMS after being disconnected from the SCMS.

16. The method of claim 15, wherein the SCMS is operable to determine from the logged information whether the certificate authority performed an unauthorized provisioning while disconnected from the SCMS.

17. The method of claim 11, wherein the SCMS is operable to connect to a plurality of certificate authorities.

18. A non-transitory computer-readable medium for securely providing certificates, the non-transitory computer-readable medium comprising a plurality of instructions that, in response to execution by a processor, cause the processor to perform operations comprising:

generating, by a security credential management system (SCMS), digital assets comprising a certificate authority signing key;

conditionally transmitting, by the SCMS, the digital assets;

receiving, by a certificate authority communicatively connected to the SCMS by a communication network, the digital assets from the SCMS; and securely provisioning, by the certificate authority, a plurality of computerized devices based on the received digital assets, wherein the securely provisioning comprises producing signed enrollment certificates using the certificate authority signing key;

wherein the certificate authority intermittently connects to the SCMS to receive the digital assets, wherein the certificate authority is operable to securely provision the plurality of computerized devices while disconnected from the SCMS, and wherein the provisioning by the certificate authority while disconnected from the SCMS is limited by a policy associated with the certificate authority.

19. The non-transitory computer-readable medium of claim 18, wherein the certificate authority is located at the site of a device manufacturer; and wherein the SCMS is remote from the device manufacturer.

20. The non-transitory computer-readable medium of claim 18, wherein the policy limits the provisioning by the certificate authority while disconnected from the SCMS according to a time of disconnection from the SCMS and/or a number of the computerized devices provisioned.

21. The non-transitory computer-readable medium of claim 18, wherein the certificate authority logs information regarding the computerized devices provisioned while disconnected from the SCMS, and wherein the certificate authority transmits the logged information to the SCMS after reconnecting to the SCMS after being disconnected from the SCMS.

22. The non-transitory computer-readable medium of claim 21, wherein the SCMS is operable to determine from the logged information whether the certificate authority performed an unauthorized provisioning while disconnected from the SCMS.

* * * * *